UNITED STATES PATENT OFFICE.

CONRAD SCHRAUBE, OF LUDWIGSHAFEN-ON-THE-RHINE, GERMANY, ASSIGNOR TO THE BADISCHE ANILIN AND SODA FABRIK, OF SAME PLACE.

YELLOW-RED DYE.

SPECIFICATION forming part of Letters Patent No. 443,408, dated December 23, 1890.

Application filed October 14, 1890. Serial No. 368,094. (Specimens.)

*To all whom it may concern:*

Be it known that I, CONRAD SCHRAUBE, doctor of philosophy, a subject of the King of Prussia, residing at Ludwigshafen-on-the Rhine, in the Kingdom of Bavaria, Empire of Germany, have invented new and useful Improvements in the Manufacture of a Yellow-Red Dye-Stuff, of which the following is a specification.

In the specification forming part of Letters Patent No. 428,530 I have described the production of a new monosulpho-acid of rosinduline, which forms a valuable material for the manufacture of dye-stuffs. In the specification of Letters Patent No. 430,975 I have described the manufacture of a disulpho-acid of rosinduline, which is a red dye-stuff enjoying a wide application in the dyeing industry, coming into commerce under the name of "azo-carmine." By further sulphonating this disulpho-acid or by sulphonating the above-mentioned monosulpho-acid more energetically than is necessary for the production of the disulpho-acid, a higher sulpho-acid readily soluble in cold water is formed. This sulpho-acid forms the subject-matter of Letters Patent No. 431,404. In my further investigations into this group of bodies, I have found that a new compound which dies wool beautiful shades of yellowish-red can be obtained by the action of certain mineral acids, preferably diluted sulphuric acid, upon the above-mentioned higher sulpho-acid of Patent No. 431,404. The production of the new dye-stuff from this said sulpho-acid by the treatment with diluted sulphuric acid appears to take place most readily at a temperature of about from one hundred and seventy-five to one hundred and eighty degrees (175° to 180°) centigrade, and I prefer to use sulphuric acid diluted to such an extent that it boils at about this temperature—that is to say, an acid containing about seventy-five per cent. (75%) sulphuric acid ($H_2SO_4$) and the rest water. If weaker acid be used the production takes place more slowly, and it is necessary, when using such acids, to heat the mixture in a closed apparatus under pressure in order to attain the above-mentioned most suitable temperature.

As an example to illustrate my invention and the manner in which it may be carried into effect, I give the following directions for the production of my new yellowish-red dye-stuff. The parts are by weight: Mix about ten parts of the sodium salt of the rosinduline sulpho-acid of Letters Patent No. 431,404 with about one hundred and fifty (150) parts of diluted sulphuric acid containing about seventy-five per cent. $H_2SO_4$, and boil the mixture in a vessel fitted with a reflux condenser for about sixteen (16) hours, or until a sample withdrawn and diluted with about ten (10) times the quantity of water gives a copious precipitate, and the mother-liquor on pouring onto filter-paper is seen to possess a yellowish-red color. Cool, bring the mixture into about one hundred and fifty (150) parts of ice, filter and press. Mix the press-cakes with sufficient caustic-soda lye to make them alkaline, and then dissolve in about two hundred and fifty (250) parts of boiling water, filter the solution to get rid of insoluble impurities and acidify with dilute sulphuric acid. Collect the coloring-matter thus precipitated on the filter and wash with water. To obtain the dye in its mercantile form of sodium salt, mix the paste thus obtained with calcined soda, taking about twelve (12) parts of this soda for every one hundred (100) parts of dry substance in the paste. Dry the mass and grind it to powder.

My new dye-stuff thus obtained as a sodium salt has the appearance of a reddish-brown powder. It is readily soluble in both hot and cold water. It is soluble in boiling alcohol, the solution being yellowish-red in color and showing a slight yellowish-brown fluorescence. It is insoluble in benzine. The aqueous solution is yellowish red in color.

A solution containing about one part dye-stuff in one thousand (1,000) parts of water shows the following reactions: Caustic soda in small quantities produces no change; in larger quantities it causes an almost complete precipitation of the dye-stuff. An equal quantity of saturated common-salt solution causes an almost complete separation of the dye-stuff from solution. A little hydrochloric or sulphuric acid makes the color of the solution yellower and precipitates the free acid, which is much less soluble in water. The new dye-stuff dissolves in concentrated sulphuric acid, giving an olive-green solution. It fixes itself on wool from the acid bath, giving beautiful shades of yellowish red, which turn yellow on treatment with hydrochloric acid.

What I claim as new, and desire to secure by Letters Patent, is—

As a new article of manufacture, the hereinbefore-described yellowish-red dye-stuff derived from rosinduline sulpho-acid, which appears as a reddish-brown powder readily soluble in both hot and cold water, giving a yellowish-red solution. It is soluble in boiling alcohol, but insoluble in benzine. Large quantities of caustic soda or saturated common-salt solution precipitate it from its aqueous solution. It is soluble in concentrated sulphuric acid, but precipitated by dilute acids.

In testimony whereof I have hereunto set my hand in the presence of two subscribing witnesses.

CONRAD SCHRAUBE.

Witnesses:
ERNEST F. EHRHARDT,
CARL KLOTZ.